United States Patent Office 3,217,217
Patented Nov. 9, 1965

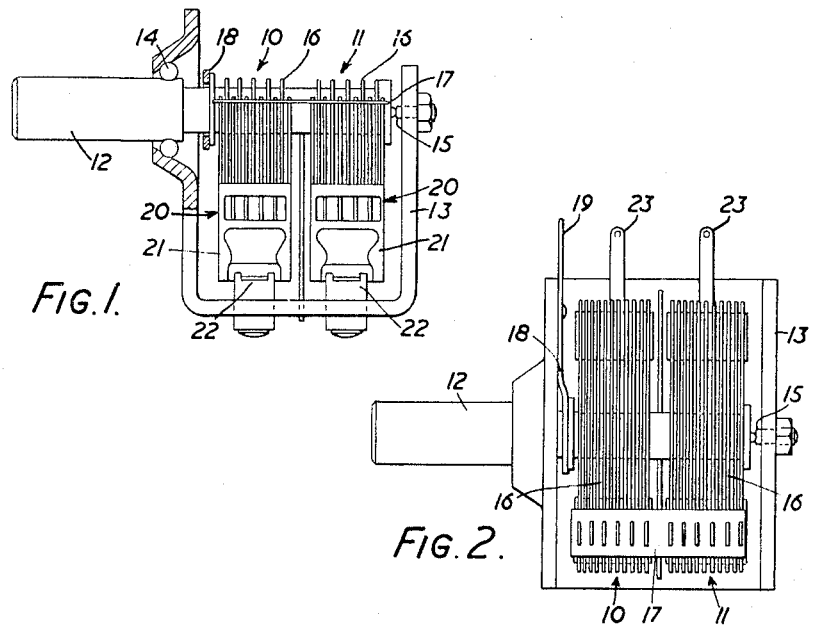
FIG. 1.
FIG. 2.
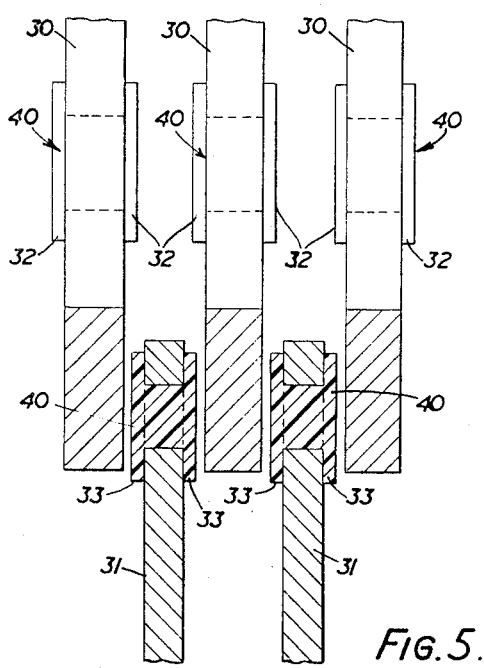
FIG. 5.

3,217,217
VARIABLE CAPACITOR WITH VANE
SPACING MEANS
Victor George Hoptroff and Michael Ben Cotton, Emsworth, and William Phillips and Edward Charles Cornelius, Clanfield, England, assignors to The Plessey Company Limited, Ilford, England, a British company
Filed Feb. 11, 1963, Ser. No. 257,711
Claims priority, application Great Britain, Feb. 13, 1962, 5,400/62; and Mar. 29, 1962, 12,087/62, 12,088/62, 12,089/62, 12,090/62, 12,091/62, and 12,092/62
8 Claims. (Cl. 317—253)

This invention relates to variable capacitors.

The air-dielectric meshing-vane capacitor, very widely used in radio and other electronic apparatus, consists essentially of two sets of spaced flat electrically-conductive vanes arranged for relative movement in the plane of their vanes so as to cause the vanes to inter-mesh to a variable extent. Air is almost universally employed as the dielectric (although for special applications other gases, or insulating liquids, may be preferred) not only for simplicity in design but because it provides a homogeneous low-loss dielectric: but its use raises problems of mechanical design since it is obviously essential that the vanes of the two sets should not be allowed to touch, and that their spacing should be held as constant as possible. These conflicting requirements have prevented the reduction in size of what may be called the standard air-dielectric capacitor, such as is employed in the ordinary radio broadcast receiver, below certain limiting dimensions, at a time when the dimensions of nearly all the other components of such receivers are being very drastically reduced.

According to this invention, a variable capacitor includes two sets of electrically-conductive vanes, each set consisting of at least one vane and the two sets being relatively movable to vary the area opposed by the or each vane of one set to at least one vane of the other set, wherein the spacing between the mutually-opposed portions some at least of the vanes of the two sets is maintained at least in part by distributed spacing means interposed between the vanes, the said distributed spacing means between any two vanes consisting of one or more spacers of electrically-insulating material interposed between the vanes and having a total projected area in the plane of either vane that is less than the greatest value of the opposed area of the vanes.

The term "distributed spacing means" used in the foregoing paragraph includes at least means effective to space apart the opposed portions of the vanes at least at two spaced points for relative positions of the vanes including at least the position for which the opposed area of the vanes has its greatest value.

Preferably the total projected area in the plane of either vane of the spacer or spacers between any two vanes is small compared with the greatest value of the opposed area of the vanes. The said total projetced area of the spacer or spacers may advantageously be less than one quarter, and in one preferred arrangement is less than one tenth, of the opposed are of the vanes at its maximum value.

The arrangement according to the invention, as defined in the preceding paragraphs, may be advantageously applied to capacitors of any physical size. Its principal application and main advantage occurs however in relation to capacitors in which the gaps between opposed vanes of the two sets do not exceed 0.020 inch; or alternatively expressed, in which the vanes of either set are spaced at a pitch not exceeding 0.075 inch, and preferably not exceeding 0.050 inch, since it is in capacitors of this size that the problems of mechanical and electrical design previously mentioned become acute.

Other features of the invention will be evident from the following description of variable capacitor constructions embodying the invention in preferred forms. The description refers to the accompanying drawing, in which:

FIGURES 1 and 2 show, in part-sectional elevation and in plan respectively, the general arrangement of a capacitor of the kind to which the invention is applicable;

FIGURE 5 is a part-section on a greatly-enlarged scale of the vanes in the position shown in FIGURE 4, on the line marked V—V in that figure;

Figure 3:
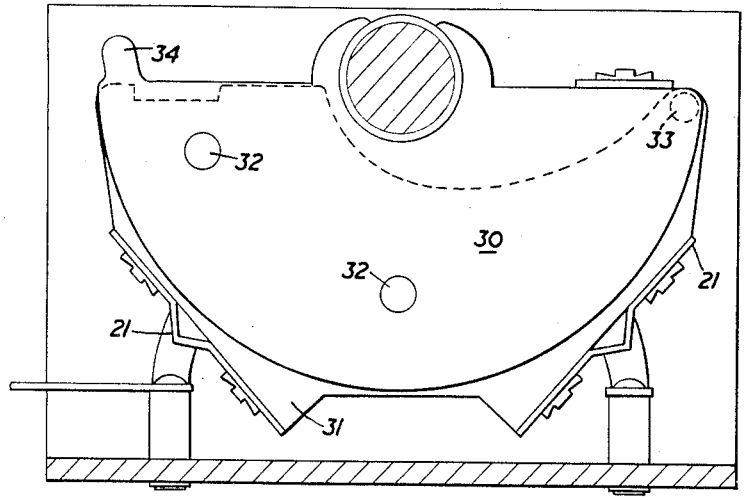
FIGURE 3 is a front elevation of one form of capacitor according to the invention, with part of the capacitor frame removed to show the relative shapes and dispositions of the vanes, with the movable vanes in their maximum capacitance position.

The general arrangement of the capacitor shown in FIGURES 1 and 2 of the drawings is typical of capacitors suitable for tuning broadcast radio receivers; the general details of its construction are irrelevant to an understanding of the present invention and will therefore be only briefly described.

The capacitor consists of two ganged capacitance sections 10 and 11 which may each have a maximum capacitance value of the order of 300 pf. The two sections have a common spindle 12 rotatable in bearings carried by the capacitor frame 13, which is a channel-shaped sheet metal member having a housing formed in one wall for the shaft ball-bearing 14. The end of the shaft remote from the ball-bearing 14 is supported by a bearing screw 15 having a socketed end face for the reception of a captive ball held in the end of the shaft. Two identical sets 16 of rotor vanes are secured in slots in the spindle 12 and rotate with it. The tips of the vanes are aligned and held at their correct axial spacing by a metal spacing strip 17 extending across both capacitor sections. A reliable electrical path between the rotor vanes and the capacitor frame 13 is provided by a contact spring 18 which is distorted to bear against a shoulder formed in the capaictor shaft 12 and which is secured to the frame 13. Part of the spring 18 projects beyond the frame to form a terminal tag 19.

The stator vane assemblies 20 consist each of an equal number of stator vanes held together in correct alignment by brackets 21, these brackets also serving to mount the stator vane assemblies on insulating pillars 22 set in the capacitor frame 13. Independent terminal tags 23 for each set of stator vanes project beyond the frame 13 of the capacitor.

The two capacitor sections are thus electrically independent although variable by the common spindle 12. Such a capacitor unit is very commonly used for tuning, in unison, an aerial circuit and a local oscillator circuit of a superheterodyne broadcast receiver.

The capacitor shown in FIGURES 1 and 2 and described in the foregoing paragraphs is in its general arrangement typical of the air-dielectric variable capacitors that have been used for receiver tuning and allied functions since the early days of the radio industry. The first capacitors of this kind produced in appreciable quantities, in the period 1920–1930, were of massive construction, with heavy brass or aluminum vanes of perhaps 0.040 inch thickness spaced apart by gaps of about 0.100 inch, giving a vane pitch in each set of vanes of about 0.280 inch. Such a capacitor, equivalent electrically to the capacitor shown in FIGURES 1 and 2, would occupy a total volume of perhaps 100 cubic inches. It had, however, a good electrical performance, since its stiff, widely-spaced vanes held their original spacing without appreciable variation in all normal service conditions.

The subsequent development of the air-dielectric capacitor has been directed to the production of a unit which while retaining the electrical advantages of the earlier units is both physically smaller and cheaper to make. In certain currently-used capacitors this process appears to have reached its limit; these capacitors have a vane pitch of rather less than 0.050 inch, and any further reduction in size by capacitors of conventional design appears unlikely.

Any variation in the spacing between the vanes of the two sets when the capacitor is in use is of course undesirable. The two sets of vanes may touch each other, or at any rate approach so closely that dust particles between the vanes provide an effective short-circuit; variation in spacing without actual contact will cause a variation in capacitance that affects the resetting accuracy of the capacitor; while variations resulting from vibrations of the vanes, for example by acoustic feedback from a receiver loudspeaker, can cause microphonic instability in the receiver. These troubles become more acute as the physical size of the capacitor is reduced, since it is more difficult to effect proportionately close control of the vane spacing as the vanes become thinner and more closely spaced. The capacitor with a vane pitch of 0.050 inch gives a performance that is acceptable, for example, in a portable broadcast receiver employing transistors: but occupying as it does a volume of about 2 cubic inches it is still, apart from the loudspeaker, by far the bulkiest single component of the receiver. Furthermore for many applications its performance, particularly in respect of resetting accuracy and liability to microphony, is barely adequate: for such applications capacitors with vane spacings of at least 0.060 inch are likely to be required.

The difficulty of manufacturing a capacitor to accurately predetermined vane spacings has also led to the use of capacitor rotors with slotted end vanes, the vane sectors so defined being deformable to permit precise setting of the capacitance values at various rotor positions after final assembly of the capacitor. The slotted vanes may be of thicker material than the remaining vanes of the rotor.

These slotted vane portions are liable to disturbance in service, disturbing the nominal capacitance rating, and tend to vibrate readily. Various alternatives to the air-dielectric capacitor have from time to time been proposed. One such construction involves the provision of thin sheets of insulating material completely separating the adjacent rotor and stator vanes. By this arrangement a high value of capacitance can be obtained in a relatively small volume; but the construction is unsatisfactory in several respects. Its assembly becomes a more complicated process, with a higher liability to error. High-quality dielectric material is necessary if the capacitor power factor is to be maintained; while the resetting accuracy is low as a result of the air gap of randomly varying width that separates the dielectric from the vane on either side.

Figure 4:
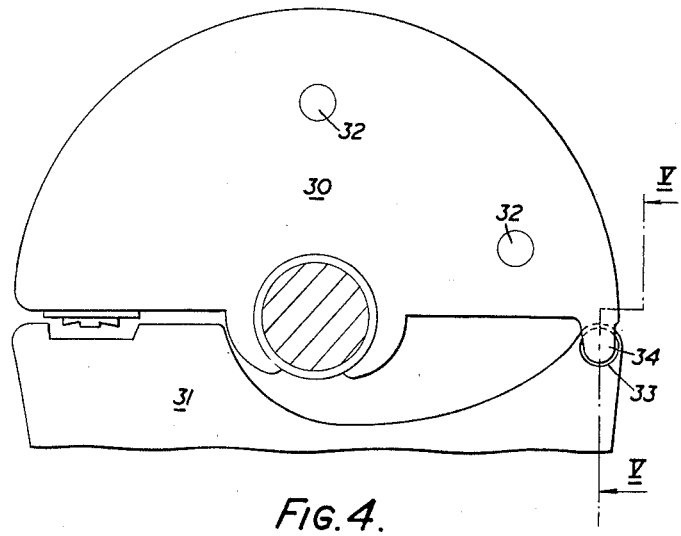
FIGURE 4 is view similar to FIGURE 3 but showing the movable vanes in their minimum capacitance position.

FIGURES 3, 4, and 5 of the drawings show vane spacing arrangements according to one preferred embodiment of the invention by which a significant reduction in the overall dimensions of a capacitor of the kind shown in FIGURES 1 and 2 may be achieved, without a corresponding loss of electrical performance. Thus FIGURES 3, 4 and 5 show vane arrangements in which the pitch of rotor and stator vanes does not exceed about 0.035 inch, and by which a two-gang capacitor unit as shown in FIGURES 1 and 2 can be made with an overall depth, excluding the spindle 12, of one inch or less. Alternatively the same vane spacing arrangements may be employed to improve the electrical performance of capacitors having larger vane pitches.

Each capacitance section of the unit consists of eight rotor vanes 30 (FIGURES 3, 4 and 5), meshing with seven stator vanes 31. The rotor vanes are stamped from sheet metal such as aluminium of 0.015 inch thickness, while the stator vanes, which are afforded a greater degree of support by their mounting brackets 21, are stamped from 0.010 inch sheet. The pitch of the sets of rotor and stator vanes is 0.035 inch; the nominal gap between opposing faces of meshed rotor and stator vanes is thus 0.005 inch. The rotor vanes are all identical, the provision of slotted rotor end vanes for precise capacitance setting being rendered unnecessary by other features of the construction.

This gap is maintained within limits by means of inter-vane spacers 32 and 33 made of low-loss insulating material such as polystyrene. Each rotor vane 30 carried on each face two of these spacers 32, disposed on an intermediate arc between the centre of rotation and the circumference of the vane. One spacer is disposed relatively near to the landing edge of the vane (that is to say the edge that leads the rest of the vane into mesh with a pair of opposed stator vanes), while the other is so positioned that it enters between the stator vanes when the rotor vanes are approximately half engaged.

Each stator vane 31 carries on each face a single spacer 33, located at a point near the extreme tip of the vane. Each rotor vane is provided at the extreme tip of its leading edge with a projecting lug 34 which even in the minimum capacitance position shown in FIGURE 4 remains in mesh with an opposed pair of stator vanes and extends between their tip spacers 33.

(It will be evident that the rotor vanes shown in full line in FIGURES 3 and 4, being the end rotor vane of the set, has no stator vane on its outermost side and therefore the spacers 32 shown on this face of the rotor vane have no function. They are however shown in this way both to illustrate the positions of the spacers on the inner vanes of the set and because owing to the preferred process used in the manufacture of the spacers 32, it is in practice convenient to allow these spacers to remain in position, although unused.)

With the rotor vanes in the minimum capacitance position shown in FIGURE 4 the spacing of the meshing portions of rotor and stator vanes is maintained by the stator vane spacers 33. As the rotor is rotated from its minimum towards its maximum position, the rotor vane spacers 32 successively enter the gaps between the opposed pairs of stator vanes, maintaining the spacing of the progressively-increasing meshed area of the vanes until in the maximum capacitance position shown in FIGURE 3 all the spacers are effective in maintaining the inter-vane spacing. The stator spacer 33 ensures that the rotor vanes are correctly centered for the entry of the rotor spacers 32. It will be seen from FIGURE 3 that in the maximum capacitance position the spacers are distributed over the entire meshed area of the vanes, and that the stator and rotor spacers, being on arcs of different radii, do not foul each other. The total area represented by the three spacers located in any one inter-vane space is only about one-fortieth of the total meshed area of the two vanes, a fraction sufficiently small to have a negligible effect on the electrical performance of the capacitor.

The relatively small superficial area of the spacers, together with the fact that the coefficient of friction between polystyrene and a smooth metal is relatively low, helps to ensure that the presence of the spacers 32 and 33 does not undesirably increase the frictional resistance to rotation of the rotor vanes.

The stator vane spacers 33, which remains permanently in mesh with the rotor vanes, project above the face of the stator vanes by a height not exceeding the nominal 0.005 inch air gap and as close to it as possible taking normal manufacturing tolerances into account, say within limits of 0.0045 to 0.005 inch; while the rotor spacers 32, which successively enter the gaps between the stator vanes as the rotor is rotated towards its maximum capacitance position, are of less height by say 0.0002 inch. This arrangement ensures that the rotor spacers 32, while of adequate height substantially to maintain the inter-vane spacing, can enter the gaps between the stator vanes without causing marked change in resistance to rotation at the instant of entry.

It will be understood that while the numbers and arrangements of the rotor and stator spacers 32 and 33 shown in FIGURES 3, 4 and 5 represent a preferred arrangement according to the invention, these factors may be widely varied in accordance with the requirements of any particular capacitor or any particular method of construction. In this construction, using small local spacers, it will be necessary to locate at least two spacers in each inter-vane gap in order to maintain sufficiently uniform vane spacing; any number of spacers above this figure may be employed but it is desirable that the total area of the spacers in any one gap does not exceed a figure of say one-tenth of the maximum meshed vane area.

In this connection it may be noted that the object of using spacers of relatively small area is primarily to reduce the proportion of the mutually-opposed vane area in which the effective dielectric constant is liable to random variations, as the result of the differing dielectric constants of each spacer and the randomly-varying air gap separating its surface from the adjacent vane. A secondary object is the reduction to a minimum value of the number of possible tracking paths provided between any two vanes by the intervening spacers: this value is a function of the area and shape of the spacers both in plan and elevation, and is conveniently minimised by the use of spacers of the smallest possible area.

The spacers 32 and 33 may be formed and attached to their respective vanes in a number of ways. For example the spacers may consist merely of discs of polystyrene of accurately-known thickness secured to the surface of the vane by adhesive. However according to the preferred method of carrying out the invention, each pair of spacers (one on either side of a given vane) consists of the flattened ends of a plug- or rivet-like piece of polystyrene which passes through the vane.

Figure 6:
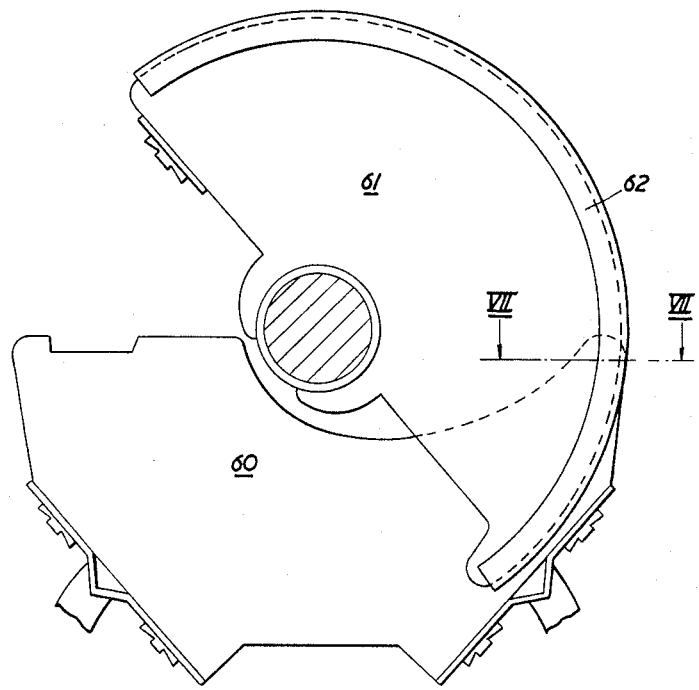
FIGURES 6, 7, 8, 9, 10 and 11 show elevation and part-sectional plan views of three modified forms of capacitor according to the invention.
Figure 7:
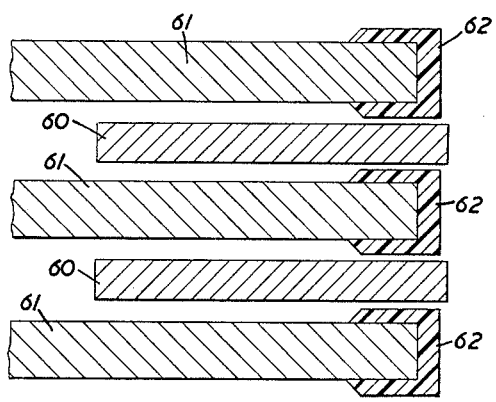

The capacitors described with reference to FIGURES 1 to 5 of the drawing have employed spacing "pips" of small individual area to maintain the inter-vane gaps. Within the general scope of the invention, however, a number of alternative forms of spacer may be employed. One such variant is shown in FIGURES 6 and 7 of the drawings. In these figures the stator vanes 60 are of conventional form, the spacing pips provided in the previous construction being omitted. The rotor vanes 61 are each provided with a peripheral spacer 62, consisting of a channel-section extrusion of polystyrene which embraces the periphery of the vane 61 and is secured thereto by adhesive. This arrangement has the disadvantage of including a larger mass of dielectric material in the inter-vane gap, the ratio of the total spacer area to the total meshed vane area being of the order of 1 to 4; but has the advantage of providing continuous support for the entire vane and of ensuring that the presence of individual spacers cannot result in jerky rotation of the rotor.

Figure 8:
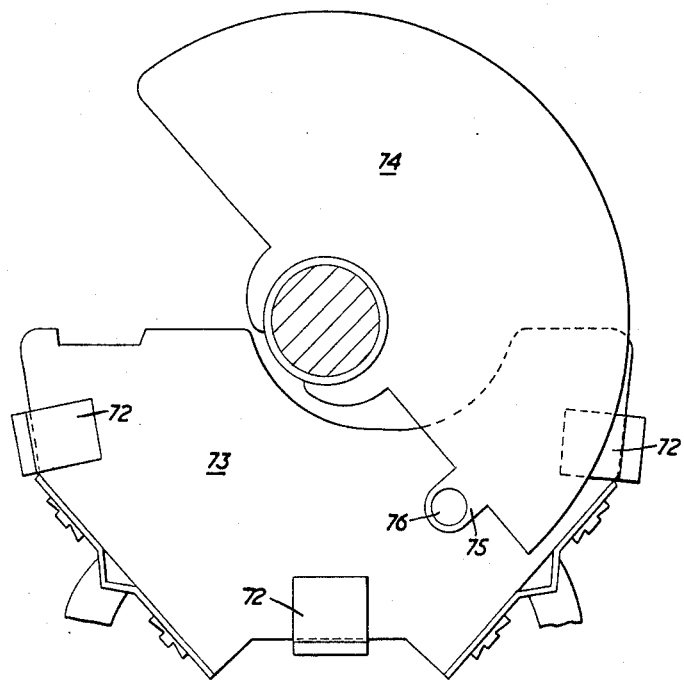
Figure 9:
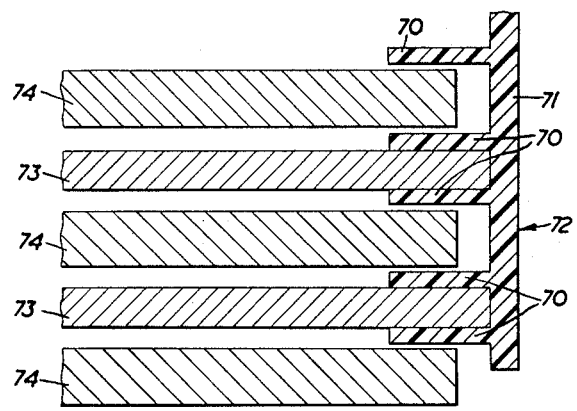

FIGURES 8 and 9 show views similar to FIGURES 6 and 7 of a further alternative arrangement according to the invention. As in the arrangement of FIGURES 1 to 5, each pair of adjacent rotor and stator vanes are separated by three spacers 70, the total area of the spacers being small compared with the greatest opposed area of the two vanes. However in this form of the invention, the spacers 70 occupying corresponding positions between different pairs of vanes are formed as projections from a common backing strip 71, the whole forming a comb-like spacer assembly 72. The backing strip 71 extends across the width of the set of stator vanes 73, to which the spacer assembly is secured, for example by adhesive bonding.

The three spacer assemblies 72 are spaced around the periphery of the stator vane set so as to provide distributed support for the rotor vanes 74 when in mesh with the stator vanes. In order to ensure that the rotor vanes 74 lead smoothly into the gaps between the spacers 70, each rotor vane is provided with a lug 75 projecting from its leading edge, the lug being inset from the outer edge of the vane sufficiently to clear the spacers 70. The lug 75 carries a spacing "pip" 76 on each side—these pips may be formed from the projecting parts of a polystyrene stud passing through the vane. The lugs 75 and the spacing pips 76 are at least partly entered between the opposing pairs of stator vanes when the rotor is in its minimum capacitance position.

The spacer assembly 72 may readily be made by injection moulding, or an equivalent process, in insulating material such as polystyrene. It may be made in continuous lengths and subsequently cut to the lengths required for any particular capacitor.

Figure 10:
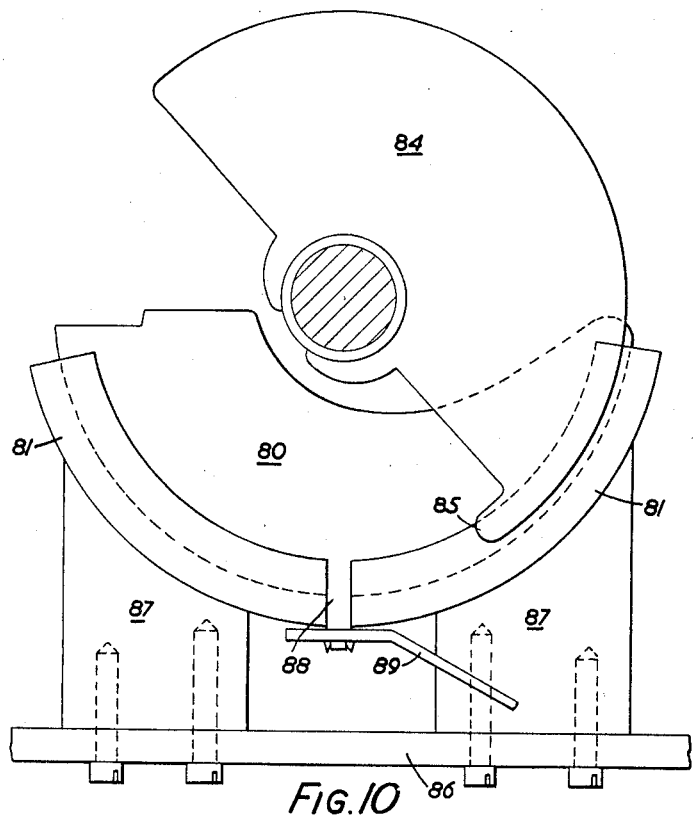
Figure 11:
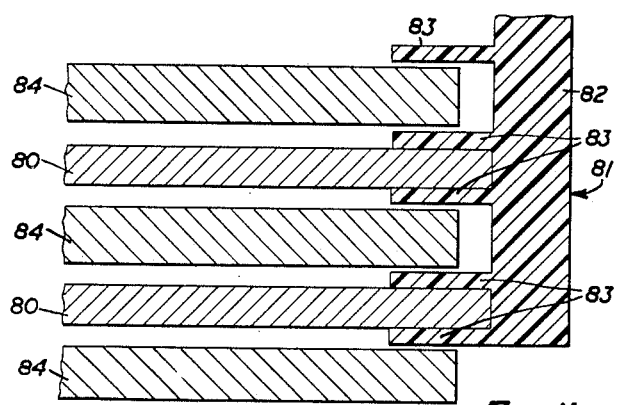

FIGURES 10 and 11 of the drawings show a further capacitor construction that may be regarded as a development of the arrangement shown in FIGURES 8 and 9. In this capacitor the stator vanes 80 are supported and held at their correct spacing by a pair of brackets 81 formed in an insulating material such as polystyrene. Each bracket 81 extends over roughly half the outer periphery of the set of stator vanes and consists of a body portion 82 from which radial strips 83 project inwardly to embrace the edges of the stator vanes 80. The thickness of the strips 83 is such that the gaps between them are sufficiently wide to accept the edges of the rotor vanes 84 without significantly impeding the free movement of the rotor; the strips 83 thus act as inter-vane spacers, providing relative support for the two sets of vanes over the full meshing area for all relative positions of rotor and stator.

Each rotor vane 84 is provided with a lug 85 extending from the tip of its leading edge, each such lug remaining between a pair of spacing strips 83 when the rotor is in its minimum capacitance position.

The brackets 81 support the stator vanes 80 in the capacitor frame 86, each bracket being provided with a mounting boss 87 by which it is secured to the frame. The bosses 87 may be formed integrally with the brackets 81, or may each consist of a separate member of the same material or a different material to which the bracket is secured. The latter arrangement may enable the brackets 81 to be made by producing a continuous strip of the correct profile, for example by extrusion, and subsequently cutting it into lengths to form the individual brackets 81, the material and dimensions of the profiled strip being chosen so that it is sufficiently flexible to be bent to the required curvature.

The electrical connection to the stator vanes 80 is effected by means of projecting tongues 88 which pass through the gap between the opposed ends of the two brackets 81 and are secured to a common terminal plate and tag 89.

In all the various embodiments of the invention hitherto described the material of the vane spacers has been polystyrene. It is of course essential to the invention that the spacers should be made of insulating material and preferably of a non-hygroscopic, non-tracking material having a low power factor. The value of its dielectric constant is of secondary importance only but should ideally be as low as is consistent with the primary requirements for the material. The material should also have a high degree of dimensional stability and be capable of being worked to close limits.

Polystyrene, polyethylene and polypropylene are readily-available materials fulfilling all there requirements. The spacing or vane assemblies shown in FIGURES 7 to 12 can be injection-moulded in these materials, while for the spacing pips shown in FIGURES 3, 4, 5 and 6. extruded rod of about 0.050 inch diameter forms a suitable stock material.

Polytetrafluoroethylene is an alternative material suitable for use in making the spacers, the manufacturing methods being appropriately modified.

What we claim is:

1. A variable air capacitor including, a rotor, at least one metallic rotor vane attached to said rotor, at least one metallic stator vane parallel to said rotor vane, said rotor vane being rotatable relatively to said stator vane to vary the area opposed by said rotor vane to said stator vane, a plurality of insulating spacers interposed between said vanes, one of said vanes including a lug of small area which remains opposed to the other vane in the minimum capacitance position of said vanes and one of said spacers which is of greater height than any other of said spacers being interposed between the lug and the opposed vane at least in the minimum capacitance position.

2. A variable capacitor as claimed in claim 1 in which the spacer remaining interposed between said vanes in their minimum capacitance position is the sole spacer fixed in relation to one of the two vanes as their opposed area is increased from its minimum to its maximum value being fixed in relation to the other of said vanes.

3. A variable capacitor according to claim 1, in which each vane has an aperture therein and each spacer comprises an insert of electrically insulating material having a portion protruding through said aperture in said vane.

4. A variable capacitor as claimed in claim 3, in which protruding parts of each insert on either side of the vane extend beyond the edges of the aperture in the vane through which the insert passes.

5. A variable capacitor as claimed in claim 1, in which the insulating spacers include at least one channel sectioned member which embraces the periphery of one of said vanes.

6. A variable capacitor according to claim 5, in which the channel sectioned member comprises a continuous spacer a progressively increasing length of which is interposed between the vanes as their mutually opposed area is increased from its minimum to its maximum value.

7. A variable capacitor as claimed in claim 5, in which the channel sectioned member serves also to attach the vane it embraces to a frame of the capacitors.

8. A variable capacitor as claimed in claim 5, wherein channel-sectioned spacer members embrace the peripheries of the vanes of one set of vanes and these channel sectioned members project inwardly from a common backing member.

References Cited by the Examiner

UNITED STATES PATENTS

| 1,604,508 | 10/26 | Zisch | 317—253 |
| 2,116,080 | 4/38 | Parker | 317—253 X |
| 2,398,721 | 4/46 | Rogers | 317—249 |
| 2,470,963 | 4/49 | Weyl | 264—248 |
| 2,835,818 | 5/58 | Selbmann | 317—253 |
| 2,913,645 | 11/59 | Hansen | 317—254 |
| 2,976,573 | 3/61 | Davis | 264—162 |

FOREIGN PATENTS

| 1,161,859 | 9/58 | France. |
| 554,801 | 7/43 | Great Britain. |
| 788,614 | 1/58 | Great Britain. |

OTHER REFERENCES

Dummer, G. W. A. "Variable Capacitors and Trimmers," London, Pitman (1957) QC 587D8 VC. 2.

JOHN F. BURNS, *Primary Examiner.*

E. JAMES SAX, *Examiner.*